March 22, 1927. 1,621,728
E. JORDAN
TRAY FOR GAS AND LIQUID CONTACT APPARATUS
Filed April 21, 1922
Fig. 1,
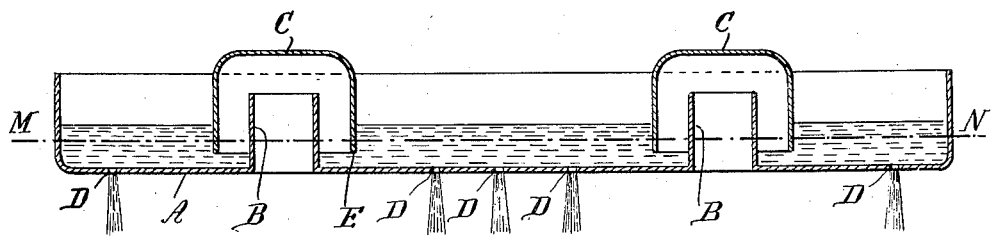
Fig. 2,
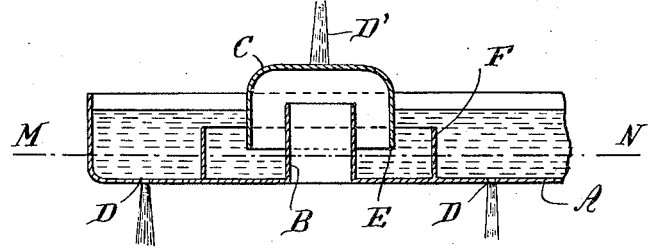
Fig. 3,
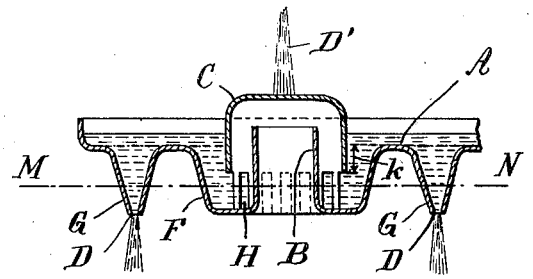
Inventor
Eugene Jordan
By his Attorneys
Pennie Davis Marvin & Edmonds Patented Mar. 22, 1927.

1,621,728

UNITED STATES PATENT OFFICE.

EUGÈNE JORDAN, OF FRANCONVILLE, FRANCE, ASSIGNOR TO SOCIETE L'AIR LIQUIDE (SOCIETE ANONYME POUR L'ETUDE ET L'EXPLOITATION DES PROCEDES GEORGES CLAUDE), OF PARIS, FRANCE.

TRAY FOR GAS AND LIQUID CONTACT APPARATUS.

Application filed April 21, 1922, Serial No. 555,875, and in France April 21, 1921.

This invention relates to plates or trays adapted for use in rectification apparatus, and particularly to certain improvements therein whereby rectification may be more effectively conducted.

Plates employed for the purpose mentioned, wherein liquids and gases are caused to contact, usually embody a tube through which the liquid descends from plate to plate, each tube terminating in an hydraulic seal at the next lower plate. Following this construction the depth of the liquid on each plate is fixed, for it is determined by the distance of the upper end of the tube above the bottom of the plate under consideration. It follows that the gas flowing upwardly in the column bubbles always through the same depth of liquid, whereas it would be an advantage to increase the depth of this liquid when the quantity of gas flowing through the apparatus increases.

Moreover, if, as often happens, the operation of the column results in the formation of foam, this foam can only be broken up by special means arranged between the plates.

It is the object of the present invention to overcome the disadvantages of structures heretofore employed in distillation and rectification operations and to provide a plate having certain advantages as hereinafter set forth.

Further objects of the invention will be apparent as it is better understood by reference to the following specification and accompanying drawing, in which—

Fig. 1 is a diagrammatic illustration of a plate embodying the invention;

Fig. 2 is a similar illustration of a slightly different form of plate; and

Fig. 3 is a similar illustration of another form of plate.

The invention involves primarily a plate which is capable of automatically varying the depth of the liquid thereon and in which the descent of the liquid from each plate is governed simply by one or more orifices placed in the bottom of the plate and of any form whatever, provided they are such that the liquid fills the orifices and adheres continuously to their edges by capillarity.

Referring to Fig. 1 of the drawing which illustrates a plate, by way of example, which is adapted to the objects of the present invention, A indicates the bottom of the plate which is provided in the usual manner with one or more upstanding tubes B, each covered by a bonnet C. In the bottom of the plate A a plurality of orifices D of relatively small cross-sectional area are provided. The liquid accumulating on the plates runs through these orifices, forming thin liquid jets which break up any foam tending to form on the succeeding plate. These jets of liquid are too small to cause splashing in falling on the liquid which covers the plate beneath. The use of these jets increases the exchanging surface between the liquid and the gas and improves the operation in this respect as well as in overcoming the disadvantages of structures previously in use.

During the filling of the apparatus the liquid, before running through the orifices to the succeeding plates, collects on each plate until it attains a certain depth indicated on Fig. 1 by the line M—N, which is variable, depending upon the diameter of the orifice and upon the material from which the plate is constructed. For example, 2 mm. of water at the temperature of the surrounding atmosphere will remain on a tin plate pierced with openings, each 1 mm. in diameter. Under this condition the lower edges of the bonnets would obviously be immersed to a certain depth in this minimum body of liquid. A difference of pressure is then established between the gaseous atmosphere on the opposite sides of the plate, and consequently a difference in level of the liquid between the interior and exterior of the bonnets. If the production of the column increases, the quantity of ascending gases also increases. Consequently, the flow of liquid over the plates and consequently the height of the liquid accumulating on them increases, thus augmenting the pressure on the orifices. This pressure increases until it corresponds to the increase of production of the column. The same phenomenon occurs in an inverse sense when there is a decrease in production. It is apparent, therefore, that the depth of liquid across which the gas bubbles varies in the same sense as the quantity thereof.

It is impossible for the gas to pass through the orifices for the reason that the pressure exerted on the orifices by the gas situated below the plate is insufficient to overcome the depth of liquid which fills the orifices, since this pressure is only sufficient to make the gas bubble, that is to say, to cause it to pass across the liquid on the plate under a depth of liquid which is less than the depth over the orifices. It may be noted that while there is bubbling, the liquid, in the neighborhood of each bonnet being emulsified, will have a mean density less than that same liquid which is not crossed by the gas. This circumstance assists in preventing the gas from passing through the orifices.

However, the plate hereinbefore described, while capable of advantageous use, may be improved because of the fact that edges E of the bonnets ought to end a slight distance from the bottom of the plate because it happens that the minimum depth is relatively slight, and it is necessary that they be below the minimum level of liquid on the plate, as has been explained above. The present invention is improved in the following manner for the purpose of making the distance to the edges of the bonnets from the bottom of the plate independent of the minimum depth of the liquid. To this end I provide about the bonnets on the plates a reserve or pocket of liquid in such manner that the liquid, when it collects on the plate while the apparatus is being filled, has first to fill the pocket before attaining the minimum height on the bottom of the plate which has the orifices. I can then arrange so that the distance of the edges of the bonnets from the bottom of the plate is as desired.

In Fig. 2 of the drawing the reserve of liquid is made possible by the presence of an annular wall F surrounding the bonnet C at a certain distance. While filling, the liquid from the upper plate falls as indicated at D' into the pocket thus provided before it runs over the edge of the wall F onto that part of the bottom of the plate which is provided with orifices D.

An advantage of the arrangement heretofore described is in making the operation of each tube with its bonnet independent of the operation of the others on the same plate. This is not the case with plates which do not include the wall F, for in this case, if for any cause whatever the edge of a bonnet ends at a distance from the bottom of the plate less than the edges of the other bonnets on the same plate, the depth of liquid through which the gas bubbles about the abnormal bonnet is greater than for the other bonnets. Consequently, the gas flow will take place preferably through the other bonnets and the increase of the quantity of the gas passing through these bonnets will blow back the liquid beneath the defective bonnet, thus increasing still further the bubbling height of the latter while thus discharging the bonnets in operation. To the contrary in the present case, the level of liquid in the pockets about each bonnet is in a certain measure independent of the level of liquid in the other pockets, and any defect of the operation of one of the bonnets remains limited to it without change occurring.

I can still further improve the plate thus constructed by other arrangements which have the advantage of diminishing the quantity of liquid on each plate and consequently of reducing the time for filling the same and the time required for placing the column, which includes these plates, in operation. I note that the orifices D of the plate are submitted only to the charge of liquid which rests thereon. The liquid near these orifices does not affect their operation. Consequently for diminishing the quantity of liquid on each plate, I can eliminate, in accordance with the present invention, the regions of useless liquid and allow only to remain the columns of liquid necessary to fill the orifices. To this end, as illustrated in Fig. 3 of the drawing, it is desirable to carry the bottom of the plate to the height of the upper edge of the wall F of Fig. 2 and to provide the bottom, instead of with orifices, with tubes or funnels G terminating in orifices D of capillary diameter. The depth of these tubes or funnels G ought to be at least equal to the distance $k$ between the edges of the bonnets and the bottom A of the plate. In practice I can give the tubes or funnels G the same depth as the pocket formed by the wall F in this figure. In Fig. 3 the edge of the bonnet C may end, for example, in windows or longitudinal cracks H, by which, the gas having ascended through the tubes B passes from the bonnets to bubble through the liquid.

It will be observed that while I have described the preferred embodiments of the invention, various changes may be made in the details and proportions without departing from the invention or sacrificing any of the advantages thereof.

Claims:

1. A substantially horizontal plate for causing contact between liquids and gases having tubes and caps for the passage of the gas through the liquid, means for maintaining a reserve of liquid around each cap and capillary openings to discharge the liquid from the plate.

2. A substantially horizontal plate for causing contact between liquids and gases having tubes and caps for the passage of the gas through the liquid, means for maintaining a reserve of liquid around each cap and downwardly projecting funnels terminating at their lower ends in openings of capillary section to discharge the liquid from the plate.

3. A substantially horizontal plate for causing contact between liquids and gases having capillary openings to discharge the liquid from the plate, means for the passage of the gas through the liquid and walls projecting upwardly from the plate and arranged around the passages for the gas.

In testimony whereof I have signed this specification.

EUGÈNE JORDAN.